United States Patent [19]

Forgione et al.

[11] 3,929,580

[45] Dec. 30, 1975

[54] CREATINE PHOSPHOKINASE TEST INDICATOR

[75] Inventors: Peter Salvatore Forgione, Stamford, Conn.; Howard M. Robbins, Chicago, Ill.

[73] Assignee: American Cyanamid Company, Stamford, Conn.

[22] Filed: Aug. 29, 1974

[21] Appl. No.: 501,587

[52] U.S. Cl.................. 195/99; 23/253 TP; 195/63; 195/68; 195/103.5 R
[51] Int. Cl.²........................................ G01N 31/14
[58] Field of Search............ 195/99, 63, 103.5 R, 68; 23/253 TP

[56] References Cited
UNITED STATES PATENTS

| | | | |
|---|---|---|---|
| 3,540,984 | 11/1970 | Deutsch | 195/103.5 R |
| 3,663,374 | 5/1972 | Moyer et al. | 195/99 X |
| 3,806,422 | 4/1974 | Moyer et al. | 195/103.5 R X |
| 3,867,259 | 2/1975 | Forgione | 195/99 |

*Primary Examiner*—David M. Naff
*Attorney, Agent, or Firm*—Frank M. Van Riet

[57] ABSTRACT

A diagnostic test indicator is prepared for the detection and determination of the concentration of creatine phosphokinase in sera comprising three superimposed layers the upper of which has contained therein the dried residue resulting from the impregnation thereof with 1. creatine phosphate and
2. adenine diphosphate, the middle of which has contained therein the dried residue resulting from the impregnation thereof with
3. glucose,
4. hexokinase,
5. triphosphopyridine nucleotide,
6. glucose-6-phosphate dehydrogenase,
7. magnesium ion and
8. d-maltose and the lower of which has contained therein
9. a tetrazolium salt and
10. phenazine methosulfate.

20 Claims, No Drawings

CREATINE PHOSPHOKINASE TEST INDICATOR

BACKGROUND OF THE INVENTION

The use of diagnostic test in the clinical testing of patients has become increasingly common in recent years. Many of these tests employ the use of test papers wherein the individual conducting the test merely contacts a reactive paper strip with a suspect material, usually a body fluid, and observes the color change or color intensity thereof in order to determine whether or not a particular effect is achieved. Test strips or cards of this type have been devised for glucose determination and treponemal diseases, for example.

Most tests for the detection of the concentration of creatine phosphokinase in body fluids have, until now, consisted of extremely complex liquid or tablet systems whereby cuvettes, devices such as spectrophotometers, ultraviolet light, timing instruments, constant temperature devices and individual standardizations etc. or intricate test plates (U.S. Pat. No. 3,663,374) must be used. There has therefore existed, for a substantial period of time, the need for a simple testing mechanism for the determination of the concentration of creatine phosphokinase, especially in sera, which long-felt need is satisfied by the instant invention more fully discussed hereinbelow.

SUMMARY

As mentioned briefly above, I have now discovered a novel test means for the determination of the concentration of creatine phosphokinase in body fluids. My test indicator is useful for the qualitative detection and quantitative determination of creatine phosphokinase and comprises reagent compositions incorporated within three superimposed layers.

The quantitative determination of creatine phosphokinase is extremely important in the detection of heart diseases in that the concentration of creatine phosphokinase in the blood is elevated noticeably over its normal concentration when diseases of the heart exist. The early detection of an abnormal rise in creatine phosphokinase concentration can therefore obviously lead to a more accurate and rapid diagnosis of heart maladies and consequently, the more rapid treatment thereof.

Because early diagnosis of abnormal heart conditions is so important, a test for the detection of variables in the concentration of creatine phosphokinase in the blood must be rapid and simple enough for the clinician to carry out but accurate enough to enable the diagnosis to be made without extreme chances of error or false readings. Such a mechanism is represented by the novel test indicators of the present invention. Utilizing my novel system, no instrumentation is necessary and no mixing or reconstitution of reagents is needed. Testing can therefore be conducted at home or in a doctor's office without any special equipment.

In the normal, generally used, solution testing of sera for creatine phosphokinase, reagent compatibility is not a problem. However, incorporation of the solution reagents together in a specific system, as herein, presents serious instability problems even during short term storage thereof since the color indicator, a tetrazolium salt-phenazine methosulfate mixture, is unstable at the pH at which the test must be carried out. Furthermore, many of the reagents used are incompatible with one another and therefore cannot be used in intimate contact with one another as in known test indicators. I have overcome these serious problems by incorporating the reagent components in individual strata, each of which is at its own stable pH and each of which contain compatible reactants, which strata are either separated by barrier adhesive layers permeable only to various reaction products or are composed of materials in the form of films which contain reagents and keep then apart from other reagents with which that are incompatible.

DESCRIPTION OF THE INVENTION INCLUDING PREFERRED EMBODIMENTS AND BEST MODE OF OPERATION

The novel diagnostic test indicators for the determination of the concentration of creatine phosphokinase, hereinafter sometimes referred to as CPK, of the present invention comprise three layers, the upper one, or that with which the sera is originally contacted, of which is composed of a bibulous carrier material such as a cellulosic paper, a cellulose acetate semi-permeable membrane etc. which contains therein the dried residue resulting from the impregnation thereof with various reagent materials.

In the preparation of my novel indicators, the upper layer is impregnated with an aqueous solution of a creatine phosphate (CP) and adenine diphosphate (ADP), in a buffer. Both phosphates are incorporated into the upper layer as solutions in water. Creatine phosphate is employed in amounts ranging from about 0.125 part to about 15.0 parts, based on 100 parts of water used while adenine diphosphate is employed in amounts ranging from about 0.0125 part to about 2.0 parts, based on 100 parts of water used. Mixtures of the creatine phosphate and the adenine diphosphate may be used, if desired, and may be incorporated into the upper layer as a mixture or individually as long as the concentrations thereof fall within the above ranges.

The (CP) and (ADP) are applied to the material forming the upper layer of the indicator only because of incompatibilities of these phosphates with components in the middle layer. The resultant dried residue in the layer should preferably have a pH ranging from about 7.2 to about 7.6, which can be accomplished by buffering the solution of these components with a buffer such that the pH of the buffer solution ranges from about 7.4 to about 7.7. Impregnation and drying of the bibulous material or semi-permeable membrane with such a solution results in the desired pH range on the resultant bibulous material.

Examples of suitable buffers include carbonate buffer, phosphate buffer, phthalate buffer, "tris" buffer, glycine, citrate-phosphate buffer, borate-succinate buffer and the like. The preferred buffer is "tris" buffer in from about 0.1 to about 1.0 M concentrations.

The middle or second layer of my novel test indicators is composed of a cellulosic bibulous material such as a cellulosic paper etc., which is impregnated with six ingredients which may be incorporated therein from a series of single aqueous or solvent solutions or as solutions of two or more ingredients. Aqueous "tris" buffered solutions are preferred. The first of these essential ingredients is glucose which is used in amounts ranging from about 0.1 part to about 2.0 parts, preferably from about 0.7 part to about 0.9 part, based on 100 parts of water used.

The second component in the middle layer of my novel test indicators is hexokinase, an enzyme known to be effective in creatine phosphokinase testing. This enzyme is incorporated in amounts ranging from about 15,000 I.U. to about 40,000 I.U., preferably from about 25,000 I.U. to about 35,000 I.U., based on 100 parts of water used.

Triphosphopyridine nucleotide is the third essential ingredient impregnated into the middle layer. This additive is used in concentrations ranging from about 400.0 parts to about 800.0 parts, preferably from about 600.0 parts to about 700.0 parts, based on 100 parts of water used.

The fourth critical constituent in the middle layer of my novel creatine phosphokinase test indicators is glycose-6-phosphate dehydrogenase, another enzyme which catalyzes the reaction which occurs between the reactants and reaction products in the indicator. This enzyme is present in amounts ranging from about 3,000 I.U. to about 7,000 I.U., preferably from about 4,000 I.U. to about 6,000 I.U., based on 100 parts of water used.

The fifth component which is incorporated into the middle layer is a magnesium ion which functions as a catalyst to initiate the reactions which occur therein. This magnesium ion may be present as a water-soluble magnesium salt such as magnesium chloride, magnesium nitrate, magnesium citrate, magnesium sulfate, magnesium acetate, magnesium bromide, etc. in amounts ranging from about 0.001 M to about 0.1 M, preferably from about 0.005 M to about 0.01 M.

The d-maltose, which comprises the last essential material impregnated into the middle layer i.e. bibulous, cellulosic carrier, functions as a stabilizer for the enzymes present therein so that storage of the final indicator does not inactivate the enzymes thereby rendering the indicator useless. The d-maltose is present in stabilizing amounts which generally range between about 10.0 and 35.0 parts, based on 100 parts of water used.

As mentioned above, these six ingredients can be incorporated into the bibulous carrier from individual aqueous solutions thereof with drying of the impregnated material being effected between each incorporation, or as mixed solutions, the ultimate impregnated material being thereafter dried and ready for incorporation into the final structure. The active ingredients must be applied to the bibulous material so that the resultant dried residue has a pH ranging from about 7.1 to about 7.6. This can be accomplished, by incorporating into the impregnating solution(s) a sufficient amount of any of the above suitable buffers so as to provide a solution of a pH of from about 7.2 to about 7.7.

The third or bottom layer of my novel creatine phosphokinase test indicators is composed of a cast film of a water-soluble polymeric material such as hydroxyethyl cellulose, carboxymethyl cellulose, maleic acid-methyl vinyl ether copolymers, methyl cellulose and the like (film thickness about 0.03 inch) containing from about 0.1 part to about 0.3 part, preferably from about 0.1 part to about 0.2 part, based on 100 parts of water used, of a tetrazolium salt indicator and from about 0.002 part to about 0.01 part, preferably from about 0.003 part to about 0.006 part, based on 100 parts of water used, of phenazine methosulfate.

This bottom layer is produced by casting a film from a solution of the polymer and additives and is capable of imparting to the area of the bottom layer with which the reduced triphosphopyridine nucleotide, produced upon reaction of the ingredients in the middle layer, comes into contact, a color of such varying intensity as to be representative of the concentration of the CPK in the test sera which is added to the upper bibulous material. These tetrazolium dyes are also well known and generally have the formula

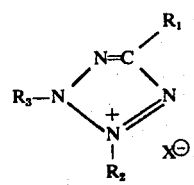

wherein $R_1$, $R_2$ and $R_3$ are the same or different aryl or substituted aryl radicals and x is an anion such as a halide etc.

Examples of useful salts include 2-(p-iodophenyl)-3-(p-nitrophenyl)-5-phenyl-2H-tetrazolium chloride (INT); nitroblue tetrazolium; blue tetrazolium; 2,3,5-triphenyl-2H-tetrazolium chloride and the like.

The pH of the tetrazolium salt, containing polymeric casting i.e. the bottom layer, should range from about 3.0 to about 6.0, the tetrazolium salt solution being adjustable to such a pH by the addition of an acid, such as hydrochloric acid, thereto before casting.

These salts are incorporated into the bottom layer of the indicator in concentrations ranging from about 0.05 part to about 0.35 part, preferably from about 0.1 part to about 0.2 part, by weight, based on 100 parts of water used.

The case film of water-soluble polymer from which the bottom layer is fabricated is itself water-soluble and relatively thin. As a result, the area of the film which comes into contact with the sera dissolves, giving the film essentially a zero thickness at that point. In this manner, the intensity of the color is greatly enhanced, a feature which makes the instant indicators more commercially attractive.

The mechanism by which the instant test indicators function is not completely understood however, although not wishing to be bound by any particular theory, it is believed that the reaction occurs thusly:

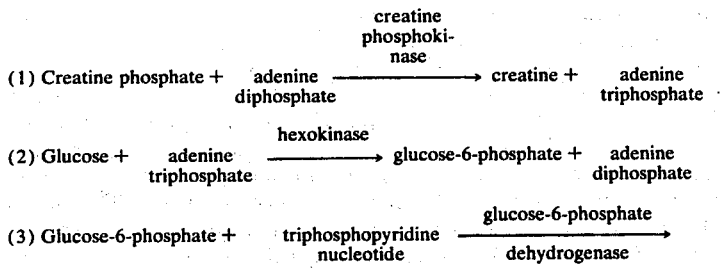

-continued
gluconate-6-phosphate + NADPH (reduced triphosphopyridine nucleotide)

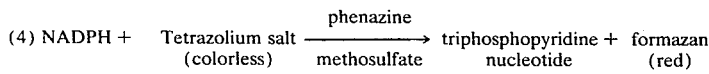

(4) NADPH + Tetrazolium salt (colorless) —phenazine methosulfate→ triphosphopyridine nucleotide + formazan (red)

The impregnation times during any of the impregnations discussed above for the upper and middle layers are not critical as long as the bibulous material is fully saturated by the solution with which it is contacted. Generally, submersion of the bibulous material in the solution for from about 5 to about 15 minutes is sufficient in all cases.

It can be seen therefore, that once sera is added to the test indicator, the creatine phosphokinase therein causes a results which subsequently result in the reduction of the tetrazolium salt and the formation of a colored indicator, the intensity of which is directly proportional to the concentration of the CPK in the sera. The clinician then merely compares the color which results to a standard color chart to ascertain the CPK concentration of the sera being tested.

A suitable non-ionic wetting agent, any of those which are well-known to the skilled artisan also may be incorporated into the upper, middle or lower layers of the indicator to cause uniform dispersion of the ingredients of the test indicator throughout each layer. For instance, I may utilize the fatty alkanolamides i.e. the alkanolamine reaction products with fatty acids such as lauric acid or stripped coconut fatty acid, suitable alkanolamines being diethanolamine, monoethanolamine, monoisopropanolamine, and the like; the ethylene oxide derived material, i.e. those derived from the reaction of ethylene oxide with alkylphenols wherein the alkyl group is octyl, nonyl or higher, long chain fatty alcohols such as tridecyl alcohol, lanolin, lecithin alcohol etc., long chain fatty acids such as tall oil, oleic acid, abietic acid etc., long chain fatty mercaptans, long chain fatty amines, polyoxypropylene glycol, fatty sorbitan ester; sugaar esters i.e. the alcoholysis reaction products of the methyl ester of a fatty acid and sucrose or raffinose; polysorbitol; polyvinyl alcohol; methyl cellulose; ethoxylated phenol/formaldehyde resins and the like. These materials may be added along with each component of the indicator, if applied singly, or in admixture with component mixtures if applied as such in amounts of 0.01 part to 1.0 part of wetting agent per 100 parts of solution used.

The upper, middle and lower layers, after drying, are then arranged in superimposed relationship in the fabrication of the final test indicators of the present invention. It is preferred that the lower and middle layers be attached to one another by applying an organic solvent soluble adhesive, permeable to the NADPH and the buffers used in the middle layer, to one side of one or both layers and pressing them together. Such a procedure is not, however, required. Suitable adhesives include cellulose acetate, cellulose phthalate-acetate mixture, polyvinyl chloride, polyvinyl alcohol-acetate mixtures and the like. Excellent results have been achieved by precoating one or both layers with a first layer of adhesive and drying before applying a second adhesive layer to effect final adhesion of the two materials together. Adhesive thickness of from about 0.01 to about 0.02 inch is satisfactory.

The main criteria for the adhesive system employed, because it covers the entire surface of either or both of the middle and lower layers, is that the produced NADPH in buffer therein, can pass therethrough and react with the reactants in the lower, water-soluble layer.

The combined lower and middle layers are then placed below the bottom of the upper layer in direct contact therewith, with or without the addition of an adhesive therebetween. No adhesive is the preferred manner. The upper layer may be held in direct contact with the middle layer by pressure such as by placing the entire three layer indicator on a self-supporting, transparent backing medium, which preferably cold flows on pressure and is of a larger dimension than the indicator, and holding the indicator in place on said medium by placing a capping section of the same material and same dimensions atop the entire structure. The capping section possesses a perforation therein of smaller dimension than the indicator and thereby exposes the center area of the upper layer of the indicator so that sera may be added thereto. The cappinng section is adhered around the periphery of the indicator to the self-supporting medium by applying pressure thereto. The indicator is then read through the transparent backing medium.

The colors of the indicators of the present invention generally range from deep red which is indicative of a high CPK level in the test serum to pink which indicates a normal CPK level. Nitroblue tetrazolium and blue tetrazolium result in, as expected, dark blue indicator colors upon contact with sera high in creatine phosphokinase.

The above concentrations expressed in connection with the components which may be incorporated into my novel indicators are set forth as to the solutions of these components which are impregnated into the bibulous carriers or formed into castings only and are not meant to specify the amount of each component which eventually remains on the bibulous carrier or is present in the final casting. That is to say, saturation of the bibulous carrier with a specific concentration of a specific component in solution or casting a specific polymer solution will not unequivocally incorporate into the bibulous carrier or the resultant casting the identical amount or percentage of component present in the solution. I have found, however, that the above concentrations of solution are generally sufficient so as to produce functional castings and so as to incorporate sufficient amounts of each component into the bibulous material upon saturation therewith to produce a functional test indicator, the absorptive capabilities of the bibulous material being characteristic of materials generally used for this purpose.

The following examples are set forth for purposes of illustration only and are not to be construed as limitations on the present invention except as set forth in the appended claims. All parts and percentages are by weight unless otherwise specified.

EXAMPLE 1

Formation of Upper Layer

An aqueous solution is prepared of 0.12 part of creatine phosphate and .0185 part of adenine diphosphate in 1.0 part of 0.1 M "tris" buffer at a pH of 7.5. A circular piece (2 inch diameter) of a commercially available cellulose acetate membrane filter (Metricel GA — 3 — Gelman Co.) is immersed in the solution for 5 minutes, removed and vacuum dried in the dark at room temperature.

Formation of Middle Layer

An aqueous solution is formed of 0.054 part of glucose, 0.045 part of triphosphopyridine nucleotide, 2.0 parts of d-maltose, 2,100 I.U. of hexokinase suspension and 330 I.U. of glucose-6-phosphate dehydrogenase in 7.0 parts of 0.1 M "tris" buffer, pH 7.5, containing $10^{-2}$ M magnesium chloride. A circular piece (2 inch diameter) of Whatman No. 42 filter paper is immersed in the solution for 6 minutes, removed, blotted of excess liquid and dried in the dark under vacuum at room temperature.

Formation of Lower Layer

A 0.03 inch water-soluble thick film is cast on a glass surface and in total darkness from a solution of 5.0 parts of methyl cellulose, 0.2 part of 2-(p-iodophenyl)-3-(p-nitrophenyl)-5-phenyl-2H-tetrazolium chloride and 0.005 part of phenazine methosulfate, acidified with acid to a pH of 4.0.

Fabrication of Test Indicator

The lower and middle layers are cut into 6 mm diameter circular sections and are adhered together with a thin coating of bonding agent by painting a solution containing 10.0% cellulose acetate in ethyl acetate on the middle layer, partially drying the coating and compressing the two layers under slight pressure. The combined layers are then placed below the upper layer with the middle layer side up to form the indicator assembly. A stiff section (10 mm diameter) of a commercially available transparent plastic with cold flow properties with a 5.8 mm diameter hole therein is then placed over the assembly with the hole directly atop the upper layer of test papers. A continuous section (10 mm diameter) of similar material is then placed directly below the lower layer of the assembly as a backing medium and the edges of the overlay and the backing medium are then bonded together by pressure.

A drop of suspect sera is then placed in the hole atop the final assembly in contact with the upper layer. After 15 minutes a dark red spot is observed on the underside of the lower layer indicative of an abnormal amount of creatine phosphokinase in the tested sera.

EXAMPLE 2

The procedure of Example 1 is again followed except that the upper membrane filter is replaced by Whatman No. 42 filter paper. Similar results are observed when the resultant indicator is contacted with the suspect sera.

EXAMPLE 3

The procedure of Example 1 is again followed except that the magnesium salt is magnesium acetate. Again a sensitive creatine phosphokinase indicator is produced.

EXAMPLE 4

Following the procedure of Example 1, a successful testing for creatine phosphokinase is made on test sera, the lower layer being cast from a solution of hydroxyethyl cellulose instead of the material used therein.

EXAMPLE 5

The procedure of Example 4 is again followed except that the lower layer is cast from a maleic acid-methyl vinyl ether copolymer (80/20). Substantially identical results are achieved.

EXAMPLE 6

The procedure of Example 1 is again followed except the tetrazolium chloride is replaced by a similar amount of nitroblue tetrazolium. An excellent creatine phosphokinase indicator is produced. A dark blue color results when testing the suspect sera.

EXAMPLE 7

When following the procedure of Example 6 except the blue tetrazolium is used, substantially identical results are observed. The color is dark blue.

EXAMPLE 8

Again following the procedure of Example 6, an excellent indicator results when 2, 3, 5-triphenyl-2H-tetrazolium chloride is employed as the tetrazolium salt. The color is very deep pink.

EXAMPLE 9

The procedure of Example 1 is again conducted except that the adhesive bonding between the middle and lower layers is eliminated. Similar results are achieved.

EXAMPLE 10

The procedure of Example 1 is again followed except that polyethylene (23) lauryl ether is incorporated into each solution from which the layers are formed in order to increase the dispersion of the ingredients over the surface of the layers. Again a very successful test indicator is formed.

We claim:

1. A diagnostic test indicator for detection and concentration determination of creatine phosphokinase in sera comprising, in superimposed relationship,
   A. an upper layer comprising a bibulous carrier material which has contained therein, at a pH of from about 7.2 to about 7.6, the dried residue resulting from the impregnation thereof with
      1. creatine phosphate and
      2. adenine diphosphate,
   B. a middle layer comprising a cellulosic, bibulous material which has contained therein, at a pH of from about 7.1 to about 7.6, the dried residue resulting from the impregnation thereof with
      3. glucose,
      4. hexokinase
      5. triphosphopyridine nucleotide,
      6. glucose-6-phosphate dehydrogenase,
      7. magnesium ion and
      8. d-maltose and
   C. a lower layer comprising a cast, water-soluble polymeric material which has contained therein, at a pH of from about 3.0 to about 6.0,
      9. a tetrazolium salt and
      10. phenazine methosulfate.

2. A diagnostic test indicator according to claim 1 wherein said (9) is 2-(p-iodophenyl)-3-(p-nitrophenyl)-5-phenyl-2H-tetrazolium chloride.

3. a diagnostic test indicator according to claim 1 wherein said (9) is nitroblue tetrazolium.

4. A diagnostic test indicator according to claim 1 wherein said (A) also contains a buffer.

5. A diagnostic test indicator according to claim 1 wherein said (B) also contains a buffer.

6. A diagnostic test indicator according to claim 4 wherein said buffer is tris buffer.

7. A diagnostic test indicator according to claim 5 wherein said buffer is tris buffer.

8. A diagnostic test indicator according to claim 1 wherein said (B) and (C) are adhered to one another.

9. A diagnostic test indicator according to claim 1 wherein said (A) is a cellulose acetate semi-permeable membrane.

10. A diagnostic test indicator according to claim 1 wherein said (B) is paper.

11. A diagnostic test indicator according to claim 1 wherein said (C) is a film of methyl cellulose.

12. A process for the preparation of the diagnostic test indicator of claim 1 which comprises impregnating a first bibulous material with an aqueous solution of said (1) and (2), thereafter drying the thus impregnated first material, impregnating a second bibulous material with an aqueous solution of said (3), (4), (5), (6), (7), and (8), thereafter drying the thus impregnated second material, casting a film from a solution containing said (9) and (10) and combining the thus prepared first and second dried materials and cast film in superimposed relationship.

13. A process according to claim 12 wherein said (9) is 2-(p-iodophenyl)-3-(p-nitrophenyl)-5-phenyl-2H-tetrazolium chloride.

14. A process according to claim 12 wherein said (9) is nitroblue tetrazolium.

15. A process according to claim 12 wherein said aqueous solutions contain a buffer.

16. A process according to claim 12 wherein said second dried material and said cast film are adhered to one another.

17. A process according to claim 12 wherein said first bibulous material is a cellulose acetate semi-permeable membrane.

18. A process according to claim 12 wherein said second bibulous material is paper.

19. A process according to claim 12 wherein said film is cast from a methyl cellulose solution.

20. A process according to claim 15 wherein said buffer is tris buffer.

* * * * *